United States Patent Office 3,073,821
Patented Jan. 15, 1963

3,073,821
α-AMINO-SUBSTITUTED GLYCINE DERIVATIVES AND PROCESS FOR PREPARING SAME
Albert Joseph Hermann Jöhl and Willy Stoll, Basel, Switzerland, assignors to Geigy Chemical Corporation, Ardsley, N.Y., a corporation of Delaware
No Drawing. Filed Feb. 17, 1960, Ser. No. 9,176
Claims priority, application Switzerland Jan. 13, 1958
22 Claims. (Cl. 260—247.1)

The present application is a continuation-in-part of application Serial No. 784,459, filed January 2, 1959, (now abandoned)

The present invention concerns new α-substituted glycine derivatives and new processes for the production of these α-substituted glycine derivatives of the formula

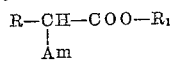

wherein Am represents an amino group selected from the group consisting of lower monoalkylamino, dialkylamino, monobenzylamino, lower alkyl-benzylamino, pyrrolidino, piperidino and morpholino, R represents a cyclic organic radical selected from the group consisting of 5.5-dimethyl-1.3-dioxy-cyclohexyl-(2), benzoylmethyl, 4-hydroxy-coumarinyl-(3), 2-hydroxy-3.5-dimethylphenyl, 1-phenyl-2.3-dimethyl-5 - oxopyrazoly-(4), 1.2-diphenyl-3.5-dioxo-4-lower alkylpyrazolidinyl-(4), 1,2 - diphenyl-3.5-dioxo-4-phenylthioethyl-pyrazolidinyl-(4), hydroxycarboxy-phenyl, and pyrryl and $R_1$ represents a member selected from the group consisting of hydrogen, lower alkyl and benzyl.

The new compounds can be used, for example as therapeutics. They are distinguished by their analgetic, antipyretic and antiphlogistic activity and a low toxicity, and are useful, for example, as analgesics, antipyretics and anti-inflamatory agents. They can be used in the treatment of rheumatic disorders.

It has surprisingly been found that glyoxylic acid, the benzyl or lower alkyl esters thereof can be condensed with compounds which contain at least one reactive methylene, methyl or methine group, in particular with 5.5-dimethyl-1.3 - dioxo-cyclohexane, acetophenone, 4-hydroxy-coumarin, 2.4-dimethyl-phenol, 1-phenyl-2.3 - dimethyl - pyrazol-5-one, 1.2-diphenyl-3.5-dioxo-4-lower alkylpyrazolidine, 1.2 - diphenyl-3.5-dioxo-4-phenylthioethyl-pyrazolidine, salicyclic acid or pyrrol, and with a primary or secondary amine, in a medium having a neutral to alkaline reaction to form glycine derivatives which are mono-substituted in the α-position as well as, mono- or di-substituted in the amino group. The reaction according to the present invention is advantageously performed at temperatures between 60 and 80° and in media having a pH from 7 to 11, advantageously between 8 and 10. The glyoxylic acid and the compound having a reactive methylene, methyl or methine group are used with advantage in equimolecular ratio, but an excess of amine, for example twice to three times the equimolecular amount, is used. This excess can, at the same time, serve to maintain an alkaline reaction until the condensation is complete. However, also the equimolecular amount of caustic soda lye or potassium lye can be used for this purpose instead of excess amine. Water is used with advantage as solvent or diluent, to which, if desired, can be added, for the improvement of the water solubility of the reaction components, organic solvents which are miscible with water, such as methanol, ethanol, isopropanol or dioxan. The same effect is also obtained in some cases with an excess of the amine used for the reaction provided the amine itself has sufficient water solubility. Under the reaction conditions, the ester group of the glyoxylic acid ester is often hydrolysed. In these cases the use of glyoxylic acid esters, for example of low molecular alkyl esters, instead of the free glyoxylic acid can also be of advantage however, as the esters are more easily obtained in a pure state than the acid, and sometimes better yields are obtained. Advantageously the ester and, thus, also the amine are used, for example in about 10% excess. The reaction can also be performed in the absence of solvents or diluents. In this case, external heating is sometimes unnecessary as, at the beginning, the reaction is exothermic, it can simply be left at room temperature. The reaction can also be performed in dimethyl-formamide or acetonitrile as solvents at a temperature of 0–5° and, if necessary, by finally heating for several hours at a temperature of 30–80°. In the last two cases, the esters of amino acids are obtained.

A further object of the invention is a process for the production of an α-substituted glycine derivative which comprises reacting by intimately mixing the following three components:

(a) A compound selected from the group consisting of glyoxylic acid, lower alkyl glyoxylate and benzyl glyoxylate, (b) A compound selected from the group consisting of lower monoalkylamine, lower dialkylamine, monobenzylamine, lower alkylbenzylamine, pyrrolidine, piperidine and morpholine, and (c) A compound selected from the group consisting of 5.5-dimethyl-1.3-dioxo-cyclohexane, acetophenone, 4-hydroxy-coumarin, 2.4-dimethyl-phenol, 1-phenyl-2.3-dimethyl-pyrazol-5-one, 1.2-diphenyl-3.5 dioxo-4-lower alkyl-pyrazolidine, 1.2 - diphenyl - 3.5-dioxo-4-phenylthioethyl-pyrazolidine, salicylic acid and pyrrol at a temperature between 0° and 80° C.

Suitable starting compounds having a reactive methylene group are, for example, dimedone and benzotetronic acid; an example of a starting material having a reactive methyl group is acetophenone; examples of those having a reactive methine group are phenol, o-hydroxybenzoic acid, 1-phenyl-2.3-dimethyl-pyrazole-5-one, and 1.2-diphenyl-3.5-dioxo-4-n-butyl- or 4-n-propyl- or 4-(2'-phenylthioethyl)-pyrazolidine. Methylamine, ethylamine, n-propylamine, n-butylamine, benzylamine, dimethylamine, diethylamine, N-methyl-N-benzylamine, pyrrolidine, piperidine and morpholine for example can be used as primary and secondary amines.

The following examples further illustrates the performance of the new process. Parts are given as parts by weight and their relationship to parts by volume is as that of grammes to cubic centimetres. The temperatures are in degrees centigrade.

*Example 1*

10 parts by volume of methanol are added to 20 parts of a 37% aqueous solution of glyoxylic acid and 7.3 parts of n-butylamine and the pH of the mixture is adjusted to 8 with 6 N-caustic soda lye. 13.2 parts of dimedone and 10 parts by volume of methanol are then added, the pH is brought to 9.5 and the mixture is refluxed for 3 hours. The methanol is then distilled off and the reaction product is precipitated by the addition of 6 N-hydrochloric acid until the pH is 4.5. The precipitate is filtered off, washed with water and dried. The α-(n-butylamino)-5.5-dimethyl-1.3-dioxo-cyclohexane-2-acetic acid so obtained in purified by washing with diethyl ether, dissolving in 6 N-caustic soda lye, treating the solution with active charcoal, precipitating the amino acid again with 6 N-hydrochloric acid, filtering off and drying. It melts on decomposition at 163–164°.

*Example 2*

A 54% aqueous solution of 14.8 parts of glyoxylic acid is neutralised with 6 N-caustic soda lye, whereupon 14.6 parts of n-butylamine, 24 parts of acetophenone, 35 parts by volume of methanol and 25 parts of water are added. The pH of the reaction mixture is then 11.3. It is refluxed for 2 hours, the methanol is distilled off and the remaining mixture is extracted with petroleum ether to remove unreacted acetophenone. On acidifying the aqueous phase with 6 N-hydrochloric acid until the pH is 4, a semi-solid precipitate is obtained which is filtered off and dried. The crude α-(n-butylamino)-β-benzoyl-propionic acid so obtained is washed with benzene, dried and reprecipitated analogously to Example 1, whereupon it melts at 178–179.5°.

*Example 3*

A 54% aqueous solution of 14.8 parts of glyoxylic acid is neutralised with 6 N-caustic soda lye and 14.6 parts of n-butylamine, 32.4 parts of 4-hydroxycoumarin and 30 parts by volume of methanol are added. The reaction mixture is refluxed for 3 hours, the same volume of methanol is then added and the reaction product is precipitated by the addition of 6 N-hydrochloric acid until the pH is 3. The precipitate is filtered off, washed with methanol and then with water and dried. On dissolving in 6 N-caustic soda lye, decolouring with active charcoal, filtering, adding half the volume of methanol and precipitating by the addition of 2 N-hydrochloric acid until the pH is 4.5, a white crystalline product is obtained which consists of equimolecular amounts of 4-hydroxy-α-(n-butylamino)-coumarin-3-acetic acid and its sodium salt.

The hydrochloride of the amino acid can be produced from this product by dissolving it in excess 6 N-hydrochloric acid (pH under 1) and filtering the solution. The hydrochloride precipitates from the filtrate. It is further purified by dissolving in a small amount of warm water with the addition of 6 N-hydrochloric acid and reprecipitated by the addition of further hydrochloric acid. After drying, the hydrochloride so obtained melts at 141–142°.

*Example 4*

100 parts by volume of a 3.6% aqueous solution of glyoxylic acid is brought to pH 7 with 6 N-caustic soda lye, whereupon 13.1 parts of morpholine are added and the whole is left for 1 hour at room temperature. 6.1 parts of 2.4-dimethylphenol dissolved in 75 parts by volume of methanol are then added dropwise. The pH is then adjusted to 9 or 7 or 6 with 2 N-hydrochloric acid and the reaction mixture is heated at 70–75° for 7 hours. The excess phenol is extracted with ether and the aqueous phase is adjusted to 4.5. The reaction product precipitates immediately. On heating, it decomposes above 184° without properly melting up to 310°.

The lower the pH of the reaction solution, the lower are the yields of α-morpholino-2-hydroxy-3.5-dimethylphenyl acetic acid.

*Example 5*

12.2 parts of 2.4-dimethylphenol, 19 parts of morpholine and 11.2 parts of glyoxylic acid ethyl ester are refluxed in 70 parts of water and 60 parts by volume of ethanol for 7 hours. No more glyoxylic acid ester can be traced after this time (no red colouration on warming with aqueous ammonia) and the pH value of the reaction solution which at the beginning was 9.65, is now 8.4 due to saponification of the ester. After cooling, the unchanged 2.4-dimethylphenol is extracted with ether and the pH of the aqueous phase is adjusted to 4.5 with 6 N-hydrochloric acid. After standing for several hours, the precipitated α-morpholino-2-hydroxy-3.5-dimethylphenyl acetic acid is filtered off and recrystallised from hot water. On heating it decomposes above 184° without really melting up to 310°. It is identical with the product obtained according to Example 4.

α-N.N-dimethylamino-2-hydroxy-3.5-dimethylphenyl acetic acid can be produced in an analogous manner. Recrystallised from water, the hydrochloride thereof decomposes at 153–172° (intensive red colouration).

*Example 6*

11.2 parts of glyoxylic acid ethyl ester and 19 parts of morpholine are dissolved in 70 parts of water and 18.8 parts of 1-phenyl-2.3-dimethyl-pyrazole-5-one are added. The reaction solution has a pH value of 9.6 and is heated for 7 hours while stirring at 70–75° whereupon the pH value is 8.6. After cooling, the reaction solution is acidified with 40 parts by volume of 6 N-hydrochloric acid whereupon the pH value is about 0.5. The reaction product is then precipitated by the addition of about 250 parts by volume of acetone, after standing in ice for two to three hours it is filtered off, washed with acetone and dried. The substance is the hydrochloride of α-morpholino-1-phenyl-2.3-dimethyl-5-oxo-pyrazole-4-acetic acid, from which the free amino acid can be obtained for example with the basic ion exchanger Permutit A. After recrystallisation from methanol, it decomposes at 191–192° and is very easily soluble in water.

*Example 7*

5.6 parts of glyoxylic acid ethyl ester and 9.6 parts of morpholine are dissolved in 35 parts of water and the solution is heated to 70–75°. A solution of 15.4 parts of 1.2-diphenyl-3.5-dioxo-4-n-butyl-pyrazolidine in 50 parts by volume of dioxan is added dropwise while stirring within 1½ hours, whereupon the reaction mixture has a pH value of 9.0. The mixture is heated for 7 hours at 70–75° and then left to stand at room temperature for another 7 hours. During the reaction it becomes dark red and at the end it has a pH of 9.2. To work up, the pH is adjusted to 6 with 1 N-hydrochloric acid, and starting material and secondary products are removed by extraction with ether. The reaction product gradually separates from the aqueous phase. It is filtered off and recrystallised twice from ethanol. The α-morpholino-1.2-diphenyl-3.5-dioxo-4-n-butyl-pyrazolidine-4-acetic acid so obtained melts on decomposition at 134–136°.

*Example 8*

15.4 parts of 1.2-diphenyl-3.5-dioxo-4-n-butyl-pyrazolidine are pasted with 4.8 parts of morpholine and 5.6 parts of glyoxylic acid ethyl ester are added. The temperature rises from 20° to about 62°. The reaction mixture is left to stand for 24 hours without any external heating, it is then suspended in 2 N-hydrochloric acid and extracted with ether. To remove the starting material, the ethereal solution is extracted with 2 N-caustic soda lye, washed with water, dried over sodium sulphate and concentrated. The remaining crude α-morpholino-1.2-diphenyl-3.5-dioxo-4-n-butyl-pyrazolidine-4-acetic acid ethyl ester is recrystallized twice from ethanol and then melts at 128–129°. It does not dissolve in 2 N-hydrochloric acid.

*Example 9*

8.0 parts of diethylamine in 60 parts by volume of dimethyl formamide are added dropwise at 0–4° to a solution of 11.2 parts of glyoxylic acid ethyl ester in 30 parts by volume of dimethyl formamide and on completion of the addition the whole is stirred for 1 hour at the same temperature. 18.8 parts of 1-phenyl-2.3-dimethyl-pyrazol-5-one in small portions are then added at 0–4°. After the reaction mixture has attained room temperature, it is stirred for 2 hours at this temperature and finally heated for 3–7 hours at 30–80°. The product is worked up by distilling off the dimethyl formamide in the vacuum in a nitrogen atmosphere. The oily residue is dissolved in ether and the reaction product is extracted with 2 N-hydrochloric acid while cooling well with ice. The hydrochloric acid solution is then immediately made alkaline with 2 N-caustic soda lye, again while intensively cooling, and extracted with ether. The ethereal solution is then washed with a little water each time until the washing water shows no traces of antipyrine with nitrous acid (green colouration discloses the presence of antipyrine). After drying the ether solution over sodium sulphate and distilling off the solvent, the residue is recrystallized from ether/petroleum ether or from ethyl acetate/petroleum ether. The α-N.N-diethylamino-1-phenyl-2.3-dimethyl-5-oxo-pyrazole-4-acetic acid ethyl ester obtained melts at 80–82°.

The following compounds are produced in an analogous manner:

α-Piperidino-1-phenyl - 2.3 - dimethyl - 5-oxo-pyrazole-4-acetic acid ethyl ester, M.P. 143–144° (from ether/petroleum ether), α-pyrrolidino-1-phenyl-2.3-dimethyl-5-oxo-pyrazole-4-acetic acid ethyl ester, M.P. 130.5–132.5° (from ethyl acetate/petroleum ether), α-N-methyl-N-benzylamino-1-phenyl-2.3-dimethyl-5-oxo - pyrazole - 4-acetic acid ethyl ester, M.P. 104–106° (from ether/petroleum ether).

The corresponding α-substituted glycine derivative can be produced in an analogous manner from glyoxylic acid ethyl ester, benzylamine and o-hydroxybenzoic acid ethyl ester.

*Example 10*

2.9 parts of morpholine are added dropwise at 0–4° to a solution of 5.4 parts of glyoxylic acid benzyl ester in 30 parts by volume of dimethyl formamide and on completion of the addition the whole is stirred for 1 hour at the same temperature. 9.2 parts of 1.2-diphenyl-3.5-dioxo-4-n-butyl-pyrazolidine in small portions are then added at 0–4°. After the reaction mixture has attained room temperature, it is stirred for 2 hours at this temperature and finally heated for 3–7 hours at 30–80°.

The product is worked up as follows: It is dissolved in ether, unchanged starting material is extracted with 2 N-sodium hydroxide, the ethereal solution is washed with water, then twice with 2 N-hydrochloric acid and again with water and dried over sodium sulphate. After removal of the solvent, the α-morpholino-1.2-diphenyl-3.5-dioxo-4-n-butyl-pyrazolidine-4-acetic acid benzylester is obtained. M.P. 71–74° (from petroleum ether).

In an analogous manner, α-morpholino-1.2-diphenyl-3.5-dioxo-4-[2′-phenylthioethyl]-pyrazolidine - 4 - acetic acid ethyl ester (M.P. 160–161°; from ethyl acetate) and α-morpholino-1.2-diphenyl - 3.5 - dioxo-4-n-propyl-pyrazolidine-4-acetic acid ethyl ester (M.P. 128–130°; from ethanol) are obtained. The latter compound may also be produced in the following manner:

11.8 parts of 1.2-diphenyl-3.5-dioxo-4-n-propyl-pyrazolidine are thoroughly mixed with 3.9 parts of morpholine. 4.5 parts of glyoxylic acid ethyl ester are then added, the mixture is kneaded and allowed to stand at room temperature for 70 hours. It is dissolved in ether, unchanged starting material is extracted with 2 N-sodium hydroxide, the ethereal solution is washed with water, then twice with 2 N-hydrochloric acid and again with water and dried over sodium sulphate. After removal of the solvent, the above-named end product is obtained. Recrystallized from ethanol, it melts at 128–130°.

*Example 11*

A solution of 9.4 parts of piperidine in 10 parts by volume of acetonitrile are added over a period of 16 hours at 0–3° to a solution of 11.2 parts of glyoxylic acid ethyl ester and 6.7 parts of pyrrol in 30 parts by volume of acetonitrile, which solution has been cooled to 0°. The whole is then stirred further for 16 hours at 0–3°.

The product is worked up as follows: The acetonitrile is distilled off in the vacuum in a nitrogen atmosphere. The oily residue is taken up in ether. The base is extracted with 2 N-hydrochloric acid while cooling well with ice and each hydrochloric acid extract is immediately made alkaline with 2 N-caustic soda lye under intensive ice cooling. The base separates as an oil and is taken up in ether. The ethereal solution is washed well with water and dried over sodium sulphate. α-Piperidino-pyrrol-2-acetic acid ethyl ester is isolated as the oxalate. It melts at 135–136°; (decomposition)(from ethanol/ether).

In the manner described in Example 10 α-morpholino-1 - phenyl - 2-[p-benzyloxyphenyl]-3.5-dioxo-4-n - butyl-pyrazolidine-4-acetic acid ethyl ester (M.P. 124–126°; from ethanol) can also be obtained.

We claim:

1. A compound of the formula

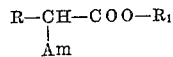

wherein
Am is an amino group selected from the group consisting of lower monoalkylamino, lower dialkylamino, monobenzylamino, lower alkyl-benzylamino, pyrrolidino, piperidino and morpholino,
R is a cyclic organic radical selected from the group consisting of 5.5-dimethyl-1.3-dioxo-cyclohexyl-(2), benzoylmethyl, 4-hydroxy-coumarinyl-(3), 2-hydroxy-3.5-dimethylphenyl, 1-phenyl-2.3-dimethyl-5-oxo - pyrazolyl - (4), 1.2-diphenyl-3.5-dioxo-4-lower alkyl - pyrazolidinyl - (4), 1.2 - diphenyl-3.5-dioxo-4-phenyl - thioethyl - pyrazolidinyl-(4), o-hydroxycarboxy-phenyl, and pyrryl-(2) and
$R_1$ is a member selected from the group consisting of hydrogen, lower alkyl and benzyl.

2. α - (n - Butylamino) - 5.5 - dimethyl -1.3-dioxo - cyclohexane-2-acetic acid.
3. α-(n-Butylamino)-β-benzoyl-propionic acid.
4. 4-hydroxy-α-(n-butylamino)-coumarin-3-acetic acid.
5. α-Morpholino-2-hydroxy-3.5-dimethyl-phenyl acetic acid.
6. α - N.N - dimethylamino - 2 - hydroxy - 3.5 - dimethyl-phenyl acetic acid.
7. α - Morpholino - 1 - phenyl - 2.3 - dimethyl - 5 - oxo - pyrazole-4-acetic acid.
8. α - Morpholino - 1.2 - diphenyl - 3.5 - dioxo - 4 - n - butyl-pyrazolidine-4-acetic acid.
9. α - Morpholino - 1.2 - diphenyl - 3.5 - dioxo - 4 - n - butyl-pyrazolidine-4-acetic acid ethyl ester.
10. α - N.N - diethylamino - 1 - phenyl - 2.3 - dimethyl-5-oxo-pyrazole-4-acetic acid ethyl ester.
11. α - Piperidino - 1 - phenyl - 2.3 - dimethyl - 5 - oxo - pyrazole-4-acetic acid ethyl ester.
12. α - Pyrrolidino - 1 - phenyl - 2.3 - dimethyl - 5 - oxo-pyrazole-4-acetic acid ethyl ester.
13. α - N - methyl - N - benzylamino - 1 - phenyl - 2.3 - dimethyl-5-oxo-pyrazole-4-acetic acid ethyl ester.
14. α - N - benzylamino - hydroxycarboxy - phenyl - acetic acid ethyl ester.
15. α - Morpholino - 1.2 - diphenyl - 3.5 - dioxo - 4 - n - butyl-pyrazolidine-4-acetic acid benzyl ester.
16. α - Morpholino - 1.2 - diphenyl - 3.5 - dioxo - 4 - [2′-phenylthioethyl]-pyrazolidine-4-acetic acid ethyl ester.
17. α - Morpholino - 1.2 - diphenyl - 3.5 - dioxo - 4 - n - propyl-pyrazolidine-4-acetic acid ethyl ester.
18. Process for the production of a compound of the formula

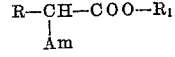

wherein
Am is an amino group selected from the group consisting of lower monoalkylamino, lower dialkylamino, monobenzylamino, lower alkyl-benzylamino, pyrrolidino, piperidino and morpholino,
R is a cyclic organic radical selected from the group consisting of 5.5-dimethyl-1.3-dioxo-cyclohexyl-(2), benzoylmethyl,4 - hydroxy - coumarinyl - (3), 2 - hydroxy - 3.5-dimethylphenyl, 1-phenyl-2.3-dimethyl-5-oxopyrazolyl-(4), 1.2-diphenyl-3.5-dioxo-4-lower alkyl - pyrazolidinyl - (4), 1.2 - diphenyl - 3.5 - dioxo-4- phenyl-thioethyl-pyrazolidinyl-(4), o-hydroxy-carboxy-phenyl, and pyrryl-(2) and $R_1$ is a member selected from the group consisting of hydrogen, lower alkyl and benzyl, which comprises reacting by intimately mixing the following three components:
- (a) a compound selected from the group consisting of glyoxylic acid, lower alkyl glyoxylate and benzyl glyoxylate,
- (b) a compound selected from the group consisting of lower monoalkylamine, lower dialkylamine, monobenzylamine, lower alkylbenzylamine, pyrrolidine, piperidine and morpholine, and
- (c) a compound selected from the group consisting of 5.5-dimethyl-1.3-dioxo-cyclohexane, acetophenone, 4-hydroxy-coumarin, 2,4-dimethylphenol, 1-phenyl-2.3-dimethyl-pyrazol-5-one, 1.2-diphenyl-3.5-dioxo-4-lower alkyl-pyrazolidine, 1.2-diphenyl-3.5-dioxo-4-phenylthioethyl-pyrazolidine, salicylic acid and pyrrol at a temperature between 0° and 80° C.

19. Process according to claim 18, which comprises intimately mixing one molar part of component (c) with at least one molar part of component (b) and adding one molar part of component (a) at room temperature.

20. Process according to claim 18, which comprises dissolving one molar part of component (a) in dimethylformamide, adding at least one molar part of component (b) at a temperature between 0° and 5°, then adding one molar part of component (c) at the same temperature and finally heating for several hours at a temperature of at least 30° and at most 80°.

21. Process according to claim 18, which comprises adjusting one molar part of component (a) to a pH-value of 7.0 to 7.1 by adding sodium hydroxide solution, then adding at least one molar part of component (b) at room temperature and allowing to stand for at least one hour, and, after adding one molar part of component (c) in ethanolic solution, heating the reaction mixture to 70–75° for several hours.

22. Process according to claim 18, which comprises dissolving one molar part of component (a) and about one molar part of component (c) in a solvent selected from the group consisting of acetonitrile and a mixture of ethanol and water and gradually adding one molar part of component (b) dissolved in said solvent, at a temperature between 0° and +5°.

References Cited in the file of this patent

UNITED STATES PATENTS

| | | |
|---|---|---|
| 2,527,574 | Rieveschl et al. | Oct. 31, 1950 |
| 3,000,888 | Biekert | Sept. 19, 1961 |